US010096165B2

United States Patent
Anderson et al.

(10) Patent No.: US 10,096,165 B2
(45) Date of Patent: Oct. 9, 2018

(54) TECHNOLOGIES FOR VIRTUAL CAMERA SCENE GENERATION USING PHYSICAL OBJECT SENSING

(71) Applicant: Intel Corporation, Santa Clara, CA (US)

(72) Inventors: Glen J. Anderson, Beaverton, OR (US); Meng Shi, Hillsboro, OR (US); Rebecca A. Chierichetti, Brookings, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/198,088

(22) Filed: Jun. 30, 2016

(65) Prior Publication Data

US 2018/0005435 A1 Jan. 4, 2018

(51) Int. Cl.
| | | |
|---|---|---|
| *G09G 5/14* | (2006.01) | |
| *G06T 19/00* | (2011.01) | |
| *G06T 7/00* | (2017.01) | |
| *G06F 3/01* | (2006.01) | |

(52) U.S. Cl.
CPC ............ *G06T 19/006* (2013.01); *G06F 3/017* (2013.01); *G06T 7/004* (2013.01); *G06T 2207/30244* (2013.01)

(58) Field of Classification Search
CPC .................................................... G06T 19/006
USPC .......................................................... 345/633
See application file for complete search history.

(56) References Cited

U.S. PATENT DOCUMENTS

| | | | | |
|---|---|---|---|---|
| 8,154,548 B2* | 4/2012 | Kuroki | ................. | G06T 11/206 345/440 |
| 2003/0217267 A1* | 11/2003 | Kindberg | .............. | H04W 12/06 713/168 |
| 2005/0017456 A1* | 1/2005 | Shechter | .................. | F41J 5/056 273/371 |
| 2008/0105748 A1* | 5/2008 | Lei | ..................... | G06K 7/10722 235/462.42 |
| 2010/0007665 A1* | 1/2010 | Smith | ..................... | G06T 13/40 345/473 |
| 2011/0285622 A1* | 11/2011 | Marti | ...................... | G06T 15/20 345/158 |
| 2011/0304611 A1* | 12/2011 | Suzuki | ................... | G06T 15/04 345/419 |
| 2012/0139899 A1* | 6/2012 | Winchester | ............. | G06T 17/20 345/419 |

(Continued)

*Primary Examiner* — Javid A Amini
(74) *Attorney, Agent, or Firm* — Barnes & Thornburg LLP (57) ABSTRACT

Technologies for virtual camera scene generation include a computing device and one or more physical objects. The computing device determines a physical position of each of the physical objects by using a position sensor to detect a position sensor target of each physical object. The computing device determines a virtual object position based on the physical position of each of the physical objects. The computing device renders a virtual camera scene based on the virtual object positions. The computing device may identify one or more three-dimensional models corresponding to the physical objects and render each of the three-dimensional models in the virtual camera scene. The computing device may determine a predefined behavior associated with a virtual object based on the physical position or identity of the physical objects, or based upon user input received from a physical object. Other embodiments are described and claimed.

22 Claims, 5 Drawing Sheets

(56) References Cited

U.S. PATENT DOCUMENTS

| | | | |
|---|---|---|---|
| 2012/0162384 A1* | 6/2012 | Vesely | G06T 19/006 348/47 |
| 2013/0044128 A1* | 2/2013 | Liu | G09G 5/00 345/633 |
| 2013/0044129 A1* | 2/2013 | Latta | G09G 5/00 345/633 |
| 2013/0093788 A1* | 4/2013 | Liu | G06F 3/011 345/633 |
| 2013/0286004 A1* | 10/2013 | McCulloch | G06T 19/006 345/419 |
| 2014/0184496 A1* | 7/2014 | Gribetz | G02B 27/017 345/156 |
| 2014/0354540 A1* | 12/2014 | Barazi | G06F 3/0416 345/156 |
| 2015/0130801 A1* | 5/2015 | Wooley | H04N 5/232 345/420 |
| 2015/0187108 A1* | 7/2015 | Mullins | G06T 19/006 345/633 |
| 2015/0241984 A1* | 8/2015 | Itzhaik | G06F 3/017 345/173 |
| 2015/0309695 A1* | 10/2015 | Sannandeji | G06F 8/34 715/763 |
| 2016/0012465 A1* | 1/2016 | Sharp | G06Q 20/18 705/14.17 |
| 2016/0014569 A1* | 1/2016 | Theimer | H04W 4/02 455/456.3 |
| 2016/0358312 A1* | 12/2016 | Kolb | G06T 5/003 |
| 2017/0011606 A1* | 1/2017 | Ceccon | G08B 13/246 |
| 2017/0071673 A1* | 3/2017 | Ferro | A61B 34/10 |
| 2017/0162177 A1* | 6/2017 | Lebeck | G09G 5/363 |
| 2017/0173466 A1* | 6/2017 | Fahmie | A63F 13/428 |

\* cited by examiner

TECHNOLOGIES FOR VIRTUAL CAMERA SCENE GENERATION USING PHYSICAL OBJECT SENSING

BACKGROUND

Augmented reality systems project virtual characters and objects into physical locations, allowing for immersive experiences and novel interaction models. Typically, an augmented reality device calculates a position of a virtual object while capturing video images of the device environment (e.g., the environment of a room in which the user of the augmented reality device is currently located). When the position associated with the virtual object is visible in the captured images, the augmented reality device may render the virtual character, for example by overlaying the environment video with a two- or three-dimensional animated rendering of the virtual character.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
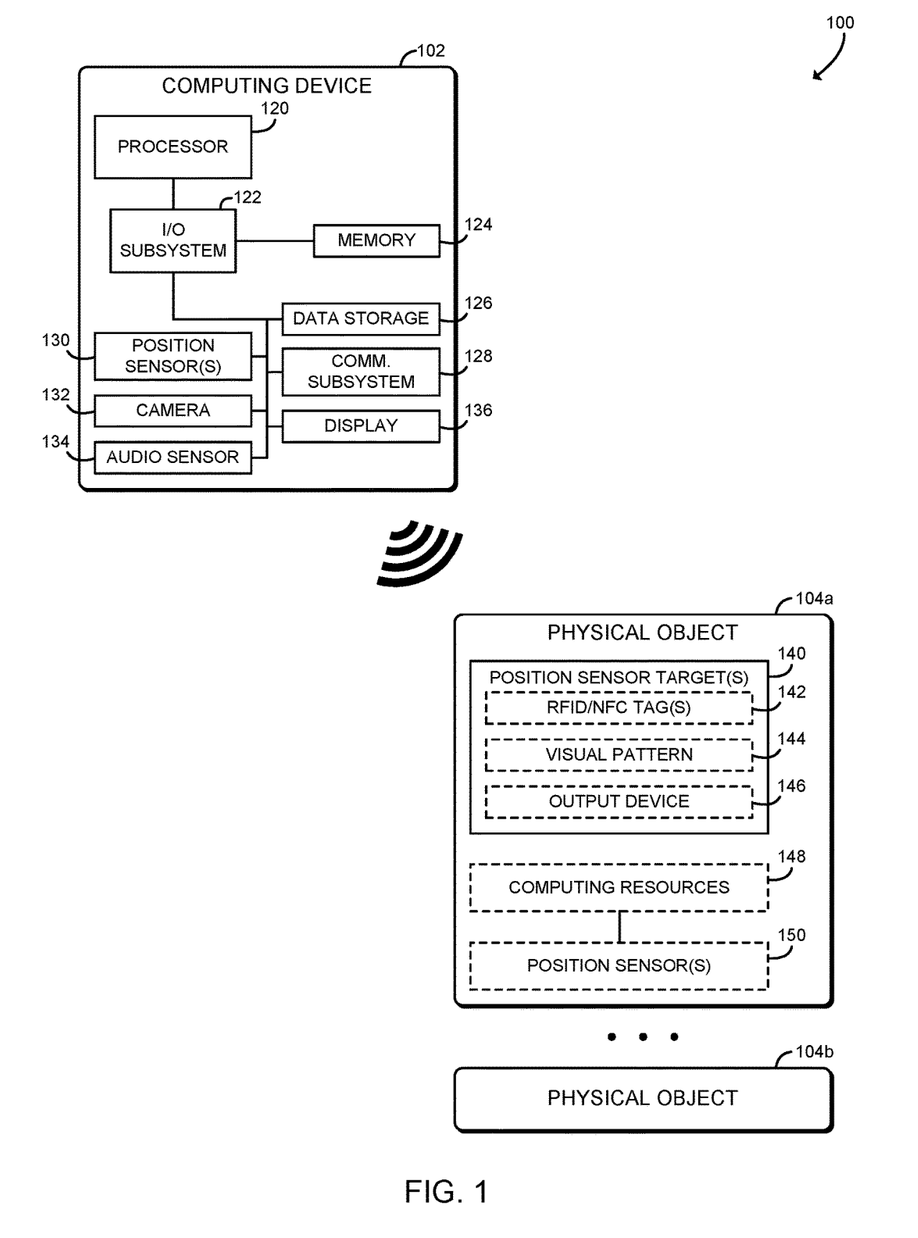
FIG. 1 is a simplified block diagram of at least one embodiment of a system for virtual camera scene generation.

Referring now to FIG. 1, in an illustrative embodiment, a system 100 for virtual camera scene generation includes a computing device 102 and one or more physical objects 104. The computing device 102 uses position sensors to determine the absolute and/or relative positions of the physical objects 104. The computing device 102 determines virtual object positions and/or camera viewpoints based on the positions of the physical objects 104, and then renders a virtual camera scene that represents those virtual objects. For example, each of the physical objects 104 may be a toy figure that corresponds to an animated character, and the computing device 102 may render a three-dimensional model of each animated character at the appropriate virtual object location within the virtual camera scene. The computing device 102 may vary the appearance and/or behavior of the virtual objects based on the context of the physical objects 104. In some embodiments, the computing device 102 may combine the virtual camera scene with media data that captures the physical scene including the physical objects 104 (e.g., captured video data). Thus, the system 100 may provide for new interactions and/or play opportunities with the physical objects 104. A user (e.g., a child) may use the system 100 to record a play session with the physical objects 104 and then relive the play session through an alternative viewpoint captured in the virtual camera scene.

The computing device 102 may be embodied as any type of computation or computer device capable of performing the functions described herein, including, without limitation, a mobile phone, a smart phone, a wearable computing device, a computer, a laptop computer, a notebook computer, a tablet computer, a network appliance, a web appliance, a distributed computing system, a processor-based system, and/or a consumer electronic device. As shown in FIG. 1, the computing device 102 illustratively includes a processor 120, an input/output subsystem 122, a memory 124, a data storage device 126, and a communication subsystem 128. Of course, the computing device 102 may include other or additional components, such as those commonly found in a smart phone (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any communication circuit, device, or collection thereof, capable of enabling communications between the computing device 102, the physical objects 104, and/or other remote devices over a network. The communication subsystem 128 may be configured to use any one or more communication technology (e.g., wired or wireless communications) and associated protocols (e.g., 3G, LTE, Ethernet, Bluetooth®, Wi-Fi®, WiMAX, etc.) to effect such communication.

As shown, the computing device 102 may also include position sensors 130, a camera 132, an audio sensor 134, and a display 136. The position sensors 130 may be embodied as one or more electronic circuits or other devices capable of determining the position of the physical objects 104. For example, the position sensors 130 may be embodied as or otherwise include one or more radio frequency identifier (RFID) and/or near-field communication (NFC) antennas that are capable of interrogating and identifying RFID tags included in the physical objects 104. In that example, the computing device 102 may include or otherwise be coupled to an array of RFID/NFC antennas capable of determining the relative positions of nearby physical objects 104, such as a sensor mat that includes the array of RFID/NFC antennas. Additionally or alternatively, in some embodiments the position sensors 130 may include proximity sensors, Reed switches, or any other sensor capable of detecting the position and/or proximity of the physical objects 104. As described further below, in some embodiments, the position sensors 130 may be capable of detecting signals emitted by the physical objects 104, such sensors capable of detecting infrared (IR) light emitted by one or more IR LEDs of the physical objects 104, microphones capable of detecting sound emitted by the physical objects 104, or other sensors. In some embodiments, other components of the computing device 102, such as the communication subsystem 128 and/or the camera 132 may be used to determine the position and/or proximity of the physical objects 104. Additionally or alternatively, in some embodiments radio strength and/or direction capabilities, such as those available in Bluetooth® Low Energy, may be used to determine the position of the physical objects 104. In some embodiments proximity sensing may occur between physical objects 104, for example, each physical object 104 may include a proximity sensing sensor. In other embodiments, sensing may occur through a surface on which the physical objects 104 sit. For example, the surface may include an array of NFC antennas that can track the identity and location of NFC tags, thus identifying the location of associated physical objects 104 on the surface.

The camera 132 may be embodied as a digital camera or other digital imaging device integrated with the computing device 102 or otherwise communicatively coupled thereto. The camera 132 includes an electronic image sensor, such as an active-pixel sensor (APS), e.g., a complementary metal-oxide-semiconductor (CMOS) sensor, or a charge-coupled device (CCD). The camera 132 may be used to capture image data including, in some embodiments, capturing still images or video images. Similarly, the audio sensor 134 may be embodied as any sensor capable of capturing audio signals such as one or more microphones, a line input jack and associated circuitry, an analog-to-digital converter (ADC), or other type of audio sensor. The camera 132 and the audio sensor 134 may be used together to capture video of the environment of the computing device 102, including the physical objects 104.

The display 136 of the computing device 102 may be embodied as any type of display capable of displaying digital information such as a liquid crystal display (LCD), a light emitting diode (LED), a plasma display, a cathode ray tube (CRT), or other type of display device. In some embodiments, the display 136 may be coupled to a touch screen to allow user interaction with the computing device 102. The computing device 102 may also include any number of additional input/output devices, interface devices, and/or other peripheral devices. For example, in some embodiments, the peripheral devices may include a touch screen, graphics circuitry, keyboard, mouse, speaker system, network interface, and/or other input/output devices, interface devices, and/or peripheral devices.

Each physical object 104 is configured to allow its position to detected by the computing device 102, as described further herein. Each physical object 104 may be embodied as any object capable of performing the functions described herein including, without limitation, a toy, a toy figure, a toy playset, a token, an embedded computing device, a mobile computing device, a wearable computing device, and/or a consumer electronic device. As such, each physical object 104 may include one or more position sensor targets 140. The position sensor targets 140 may be embodied as any circuitry, antenna, device, physical feature, or other aspect of the physical object 104 that may be detected by the position sensors 130 of the computing device 102. For example, as shown, the position sensor targets 140 may include one or more RFID/NFC tags 142, visual patterns 144, and/or output devices 146. The visual patterns 144 may be detected, for example, by the camera 132 of the computing device 102. The output devices 146 may include any device that generates a signal that may be detected by the computing device 102. For example, the output devices 146 may be embodied as one or more visible light and/or IR LEDs, a speaker, or other output device.

In some embodiments, each of the physical objects 104 may also include computing resources 148, such as processing resources (i.e., a microcontroller), memory resources, user input resources, and/or communication resources. For example, in some embodiments the computing resources 148 may include a processor, an I/O subsystem, a memory, a data storage device, a communication subsystem, and/or peripheral devices. Those individual components of the physical objects 104 may be similar to the corresponding components of the computing device 102, the description of which is applicable to the corresponding components of the physical objects 104 and is not repeated herein so as not to obscure the present disclosure. In particular, in some embodiments, the physical object 104 may include user input devices such as motion sensors (e.g., accelerometers and/or gyroscopes), touch sensors (e.g., capacitive or resistive touch sensors, force sensors, or other touch sensors), input buttons, or other input devices. In some embodiments, the physical objects 104 may include one or more position sensors 150. The position sensors 150 may be used to determine the relative position of the physical object 104 with respect to other physical objects 104. Thus, the position sensors 150 may be similar to the position sensors 130 of the computing device 102, the description of which is not repeated herein. Of course, it should be understood that in some embodiments the physical objects 104 may not include any computing resources other than passive position sensor targets 140. For example, the physical objects 104 may be embodied as toys including one or more RFID/NFC tags.

Figure 2:
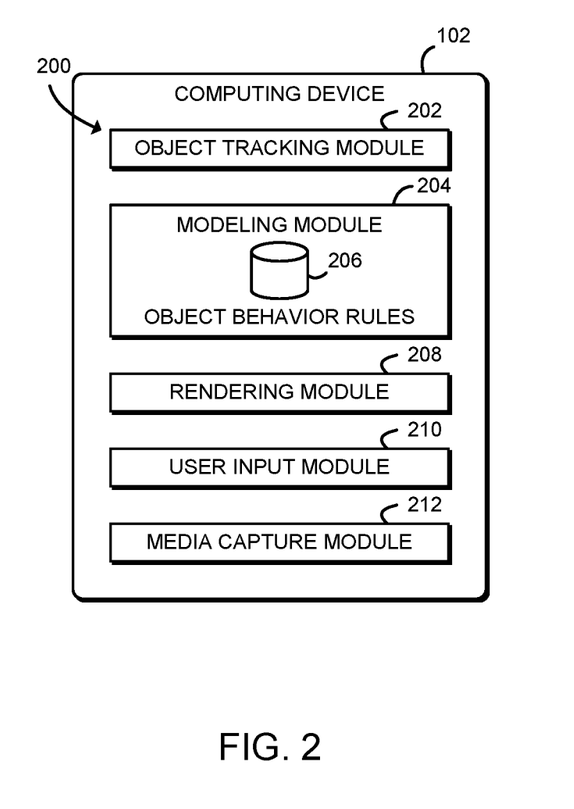
FIG. 2 is a simplified block diagram of at least one embodiment of an environment that may be established by a computing device of FIG. 1.

Referring now to FIG. 2, in an illustrative embodiment, the computing device 102 establishes an environment 200 during operation. The illustrative environment 200 includes an object tracking module 202, a modeling module 204, a rendering module 208, a user input module 210, and a media capture module 212. The various modules of the environment 200 may be embodied as hardware, firmware, software, or a combination thereof. As such, in some embodiments, one or more of the modules of the environment 200 may be embodied as circuitry or collection of electrical devices (e.g., object tracking circuitry 202, modeling circuitry 204, rendering circuitry 208, user input circuitry 210, and/or media capture circuitry 212). It should be appreciated that, in such embodiments, one or more of the object tracking circuitry 202, the modeling circuitry 204, the rendering circuitry 208, the user input circuitry 210, and/or the media capture circuitry 212 may form a portion of one or more of the processor 120, the I/O subsystem 122, and/or other components of the computing device 102. Additionally, in some embodiments, one or more of the illustrative modules may form a portion of another module and/or one or more of the illustrative modules may be independent of one another.

The object tracking module 202 is configured to determine a physical position of each of the physical objects 104 using the position sensors 130 of the computing device 102. The positions sensors 130 may be used to detect the position sensor target 140 of each of the physical objects 104. The object tracking module 202 may be further configured to determine a physical orientation of each of the physical objects 104 with the position sensor 130.

The modeling module 204 is configured to determine one or more virtual object positions based on the physical positions of the physical objects 104. Each virtual object position corresponds to a physical object 104. The modeling module 204 may be further configured to determine one or more virtual object orientations based on the physical orientations of the physical objects 104. The modeling module 204 may be further configured to determine a virtual camera point of view for the virtual camera scene based on the physical positions of the physical objects 104. In some embodiments, the modeling module 204 may be further configured to determine a predefined behavior associated with a virtual object as a function one or more object behavior rules 206. The predefined behaviors may include predefined modifications to one or more attributes of the virtual object, such as appearance, animation, dialog, or other attributes. The object behavior rules 206 may define mappings between the context of the physical objects 104 and the predefined behaviors. The context of the physical objects 104 may include the relative positions of the physical objects 104, the identities of the physical objects 104 included in the virtual camera scene, user input gestures, or other contextual data.

The rendering module 208 is configured to render a virtual camera scene based on the one or more virtual object positions and/or virtual object orientations. The virtual camera scene includes one or more virtual objects corresponding to the physical objects 104. The virtual camera scene may be rendered as video data, still image data, or any other media data indicative of the virtual camera scene. In some embodiments, the rendering module 208 may be configured to identify one or more three-dimensional models corresponding to physical objects 104 and to render each of the one or more three-dimensional models.

The user input module 210 is configured to capture user input data from the physical objects 104 and then identify an input gesture based on the user input data. The user input data may be embodied as, for example, motion data from a motion sensor of the physical object 104, touch input data from a touch sensor of the physical object 104, or other user input data generated by user input devices. The modeling module 204 may be further configured to determine a predefined behavior associated with a virtual object as a function of the input gesture using the object behavior rules 206.

The media capture module 212 is configured to capture media data indicative of a physical scene that includes the physical objects 104. For example, the media capture module 212 may be configured to capture video data using the camera 132 and/or audio sensor 134 of the computing device 102. The rendering module 208 may be further configured to insert the virtual camera scene into the media data indicative of the physical scene. The rendering module 208 may be configured to identify an insertion point in the media data and then insert the virtual camera scene at the insertion point.

Figure 3A:
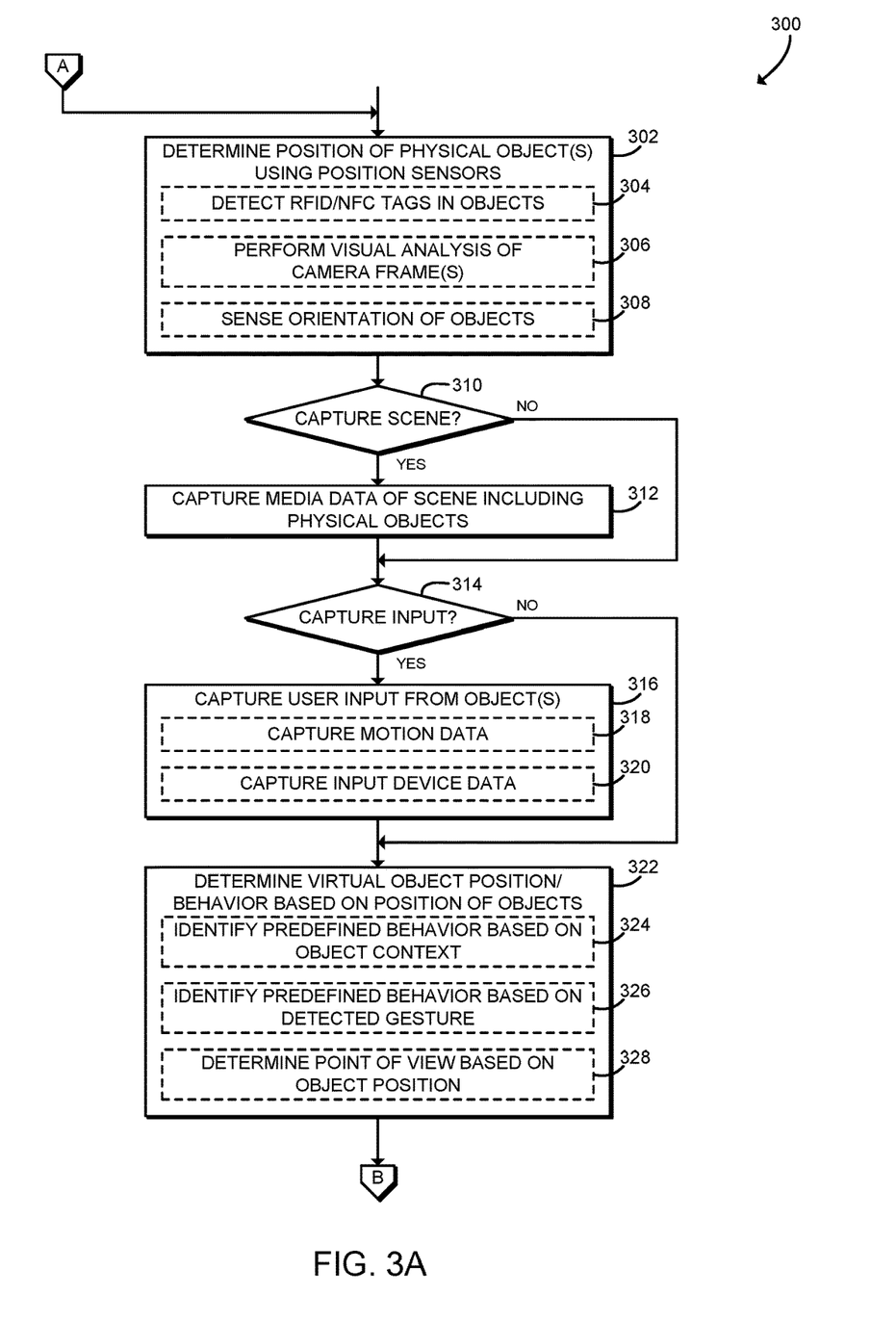
FIGS. 3A and 3B are a simplified flow diagram of at least one embodiment of a method for virtual camera scene generation that may be executed by the computing device of FIGS. 1 and 2.

Referring now to FIG. 3, in use, the computing device 102 may execute a method 300 for virtual camera scene generation. The method 300 begins with block 302, in which the computing device 102 determines the position of the physical objects 104 using the position sensor(s) 130 of the computing device 102. The computing device 102 may use any technique or combination of techniques to determine the absolute and/or relative position of one or more physical objects 104. The particular technique used may depend on the available position sensors 130 of the computing device 102 and the position sensor targets 140 of the physical objects 104. In some embodiments, in block 304 the computing device 102 may detect RFID tags, NFC tags, or other remote radio detection tags embedded in the physical objects 104. For example, a sensor mat included in or coupled to the computing device 102 may include an array of RFID antennas that may be used to detect the presence of and relative position of multiple physical objects 104. In some embodiments, in block 306 the computing device 102 may perform visual analysis of one or more camera frames to determine the position of the physical objects 104. For example, the computing device 102 may identify symbols, bar codes, or other visual patterns included on the physical objects 104, or the computing device 102 may perform object recognition. In some embodiments, in block 308 the computing device 102 may also sense the orientation of the physical objects 104. For example, each physical object 104 may include multiple position sensor targets 140 (e.g., multiple RFID tags, multiple IR LEDs, and/or multiple visual patterns) and the computing device 102 may determine the orientation of the physical object 104 based on the signals received from the multiple position sensor targets 140.

In block 310, the computing device 102 determines whether to capture the current physical scene. The computing device 102 may use any criteria to determine whether to capture the physical scene. For example, in some embodiments the computing device 102 may capture the physical scene in response to a user command or other user setting. As another example, in some embodiments the computing device 102 may be pre-configured to capture the current physical scene, for example, if the computing device 102 includes appropriate video capture hardware. If the computing device 102 determines not to capture the physical scene, the method 300 branches ahead to block 314, described below. If the computing device 102 determines to capture the physical scene, the method 300 advances to block 312, in which the computing device 102 captures media data indicative of the physical scene that includes the physical objects 104. For example, the computing device 102 may use the camera 132 and/or the audio sensor 134 to capture video of the physical objects 104. The computing device 102 may capture the physical scene from the perspective of the computing device 102 (for example when using an integrated camera 132) or from another perspective (for example when using a remote camera 132).

In block 314, the computing device 102 determines whether to capture user input data from the physical objects 104. The computing device 102 may use any criteria to determine whether to capture user input data. For example, in some embodiments the computing device 102 may capture the user input data in response to a user command or other user setting. As another example, in some embodiments the computing device 102 may be pre-configured to capture user input data, for example, if the physical objects 104 include appropriate user input devices (e.g., motion sensors, touch sensors, or other input devices). If the computing device 102 determines not to capture user input data, the method 300 branches ahead to block 322, described below. If the computing device 102 determines to capture user input data, the method 300 advances to block 316.

In block 316, the computing device 102 captures user input data from one or more of the physical objects 104. The computing device 102 may, for example, receive user input data from the physical objects 104 using the communication subsystem 128. The user input data may be transmitted using a wireless networking protocol, a personal-area networking protocol (e.g., Bluetooth), a near-field communication protocol, or through any other appropriate communication protocol. Thus, the computing device 102 and the physical objects 104 may communication directly or through a network. In some embodiments, in block 318 the computing device 102 may capture motion data from the physical objects 104. The motion data may be generated, for example, by one or more motion sensors of the physical objects 104, such as accelerometers or gyroscopes. In some embodiments, in block 320, the computing device 102 may capture input device data from the physical objects 104. The input device data may be generated, for example, by a user input device such as a touch-enabled sensor, a force sensor, a pushbutton, or other input device of the physical objects 104.

In block 322, the computing device 102 determines virtual object positions and/or behaviors based on the detected positions of the physical objects 104. Each virtual object position corresponds to a virtual object that may be rendered to represent the corresponding physical object 104. Thus, the virtual object positions may correspond to the physical positions of the physical objects 104. In other words, the virtual objects may have the same absolute and/or relative positions as the physical objects 104.

The behavior of the virtual objects may include modifications to one or more attributes of the associated virtual object. For example, the behavior may include modifications to the appearance of the virtual object (e.g., color, type, facial expression, or other visual attributes of the virtual object), the animation of the virtual object, dialog associated with the virtual object, or other attributes. In some embodiments, in block 324 the computing device 102 may identify a predefined behavior based on the context of the physical objects 104. The object behavior rules 206 may include mappings between object contexts and predefined behaviors. Context may include the relative position, identity, and other attributes of the physical objects 104 present in the virtual camera scene. For example, the physical objects 104 may be associated with virtual characters, and the virtual characters may vary their behavior depending on which other virtual characters are included in the virtual camera scene, the proximity of certain other virtual characters, or other contextual data. In some embodiments, in block 326 the computing device 102 may identify a predefined behavior based on a detected gesture performed by a user. The object behavior rules 206 may include mappings between gestures and predefined behaviors. The gesture may be detected based on captured user input data as described above in connection with block 316, based on the position of the physical objects 104 determined as described above in connection with block 302, or based on any other user input gesture detected by the computing device 102. For example, the user may shake a physical object 104 to generate motion data, and in response the virtual object associated with that physical object 104 may perform a predefined animation. As another example, the user may touch and/or squeeze a particular part of the physical object 104 to generate user input touch data, and in response the virtual object associated with that physical object 104 may perform a predefined animation.

In some embodiments, in block 328 the computing device 102 may determine a point of view for the virtual camera scene based on one or more object positions. For example, in some embodiments the virtual point of view may match the point of view of the virtual object associated with the physical object 104. In those embodiments, a physical object 104 may be used as a "virtual camera," allowing the user to position the physical object 104 in order to frame the virtual camera scene. Additionally or alternatively, in some embodiments the virtual point of view may be determined based on the context of the physical objects 104. For example, the virtual point of view may be set to allow all of the virtual objects to be visible within the frame of the virtual camera scene. As another example, the point of view of the virtual camera may pan and/or zoom as new physical objects 104 are detected in order to incorporate their associated virtual objects into the virtual camera scene. Rules for camera motion and scene composition may also be included in the object behavior rules 206.

Figure 3B:
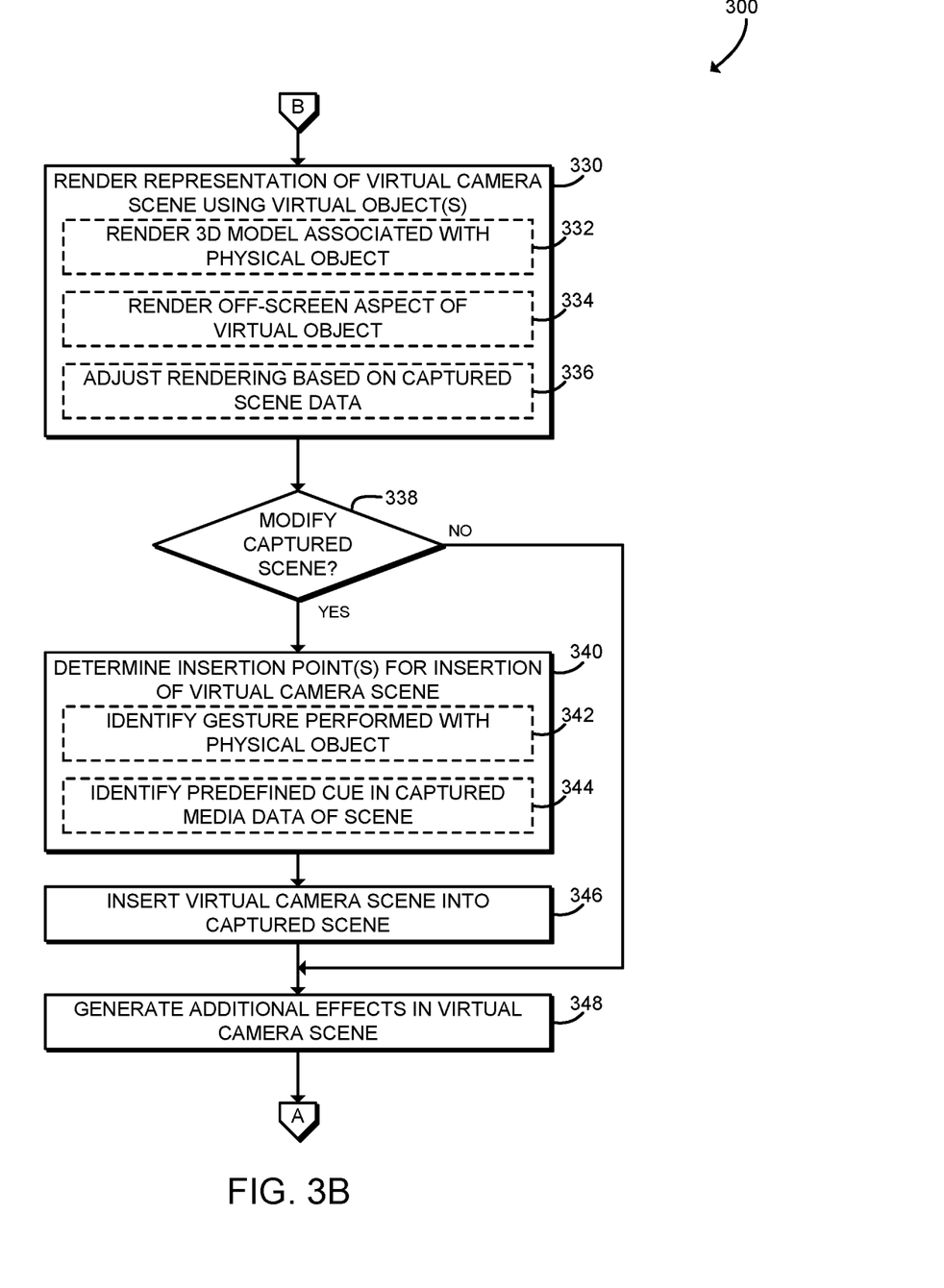

In block 330, shown in FIG. 3B, the computing device 102 renders a representation of the virtual camera scene using the virtual objects. The computing device 102 may render the virtual camera scene in any appropriate media format. For example, the computing device 102 may render the virtual camera scene as video, still images, audio, or other audiovisual data. Of course, in some embodiments the computing device 102 may also render the virtual camera scene using other output technologies, such as haptic feedback. The computing device 102 may render the virtual camera scene in real time and/or may store the virtual camera scene for later playback. In some embodiments, in block 332 the computing device 102 may render a three-dimensional model associated with each of the physical objects 104. For example, each physical object 104 may be associated with a virtual character or a virtual object, and the computing device 102 may maintain a database of 3-D models for those virtual characters and virtual objects. In some embodiments, in block 334 the computing device 102 may render an off-screen aspect of one or more virtual objects. For example, when a virtual object is not visible in the virtual camera scene (e.g., located behind the virtual camera or otherwise outside of the frame of the virtual camera scene), the computing device 102 may render audio, haptic, or other effects associated with the virtual object. Additionally, as described above in connection with block 322, the visible virtual objects may alter their behavior based on the presence of an off-screen virtual object. In some embodiments, in block 336, the computing device 102 may alter the rendering of the virtual camera scene based on the physical scene data that was captured as described above in connection with block 312. For example, in some embodiments the computing device 102 may alter a virtual character's mouth movements to match recorded audio from the physical scene.

In block 338, the computing device 102 determines whether to modify the captured scene. The computing device 102 may use any criteria to determine whether to modify the captured scene. For example, in some embodiments the computing device 102 may modify the captured scene in response to a user command or other user setting. As another example, in some embodiments the computing device 102 may be pre-configured to modify the captured scene, for example, if the computing device 102 already determined to capture the scene as described above in connection with block 310. If the computing device 102 determines not to modify the captured scene, the method 300 branches ahead to block 348, described below. If the computing device 102 determines to modify the captured scene, the method 300 advances to block 340.

In block 340, the computing device 102 identifies one or more insertion points within the captured media for the insertion of the virtual camera scene. The insertion points may be embodied as any frame, timestamp, or other point within the media data at which the virtual camera scene should be inserted. In some embodiments, in block 342 the computing device 102 may identify a gesture performed with a physical object 104. The gesture may be detected based on captured user input data as described above in connection with block 316, based on the position of the physical objects 104 determined as described above in connection with block 302, or based on any other user input gesture detected by the computing device 102. For example, the user may shake or otherwise perform a predefined motion with a physical object 104. The computing device 102 may identify the insertion point as the frame(s) in the captured media that correspond with that predefined motion. In some embodiments, in block 344 the computing device 102 may identify a predefined cue in the captured scene. For example, the computing device 102 may identify a predefined line of dialog spoken by the user during the captured scene. The computing device 102 may identify the insertion point as a frame in the captured media preceding or following the predefined cue.

In block 346, the computing device 102 inserts the virtual camera scene into the captured scene. For example, the computing device 102 may cut to the virtual camera scene, generate a virtual camera angle of the captured scene, combine visuals from the virtual camera scene with audio from the captured scene, composite the virtual camera scene with the captured scene, or otherwise combine the virtual camera scene with the captured scene. The virtual camera scene may replace content in the captured scene. For example, the virtual camera scene may replace an identified segment of the captured scene. The combined virtual camera scene and captured scene may be rendered in real time and/or may be stored for later playback.

In block 348, the computing device 102 may generate additional effects in the virtual camera scene. The particular effects included may be specified by a user of the computing device 102. For example, the virtual camera scene may be rendered in a particular style specified by the user, with particular visual effects such as lighting specified by the user, with voice-over provided by the user, or with any other appropriate effects. After rendering the virtual camera scene, the method 300 loops back to block 302, shown in FIG. 3A, to continue detecting the position of the physical objects 104 and rendering the virtual camera scene.

Figure 4:
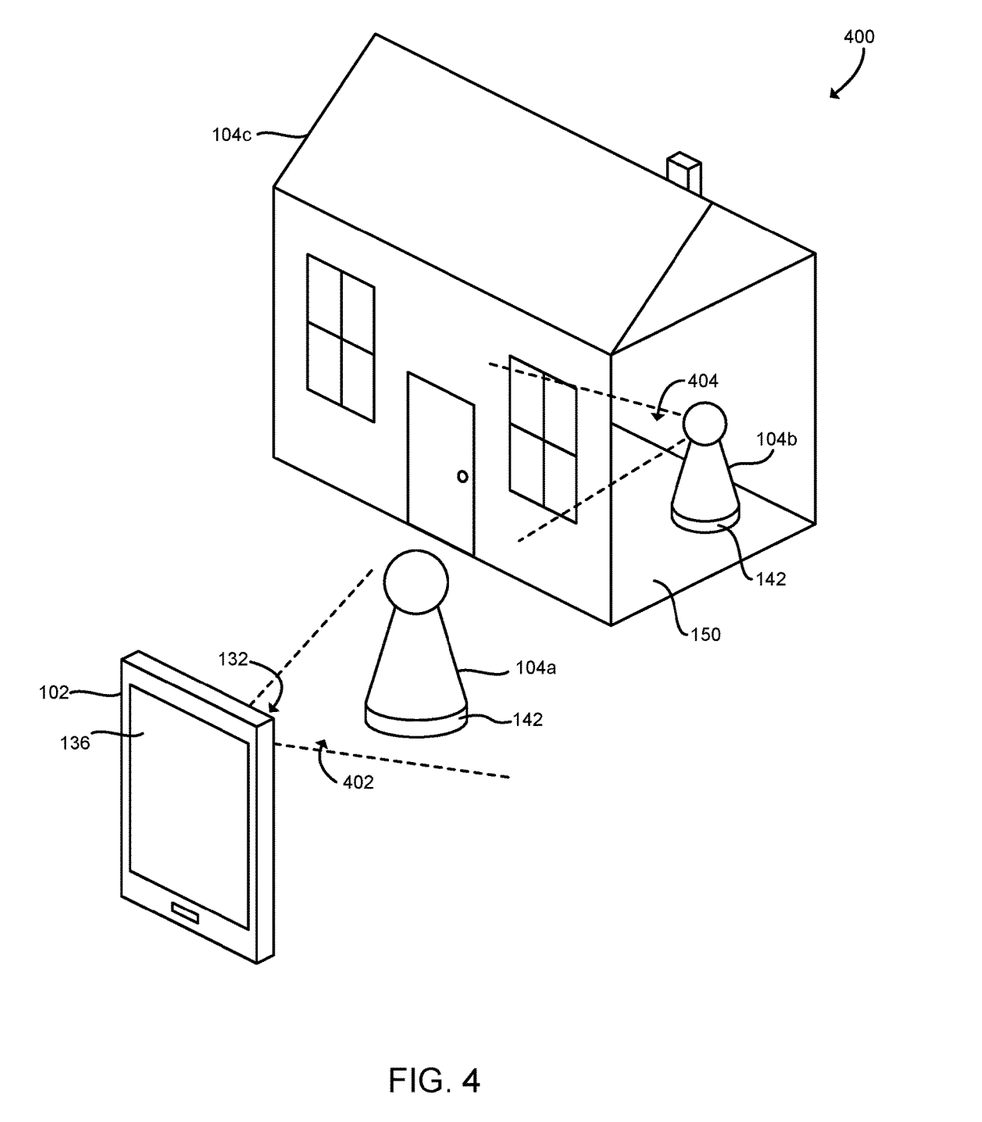
FIG. 4 is a schematic diagram illustrating at least one embodiment of the computing device and multiple physical objects of FIGS. 1 and 2 being used together.

Referring now to FIG. 4, schematic diagram 400 illustrates one potential embodiment of the computing device 102 and the physical objects 104. In the illustrative embodiment, the computing device 102 is a mobile computing device 102 with a video camera 132 and a display 136. The illustrative embodiment further includes three physical objects 104, which are all toys. The physical objects 104a, 104b are toy figures, and the physical object 104c is a toy house. Each of the physical objects 104a, 104b includes an RFID tag 142 that may be detected by the computing device 102. The physical object 104c includes an array of RFID sensors 150 that may also detect the presence of the RFID tags 142 of the physical objects 104a, 104b.

In the illustrative embodiment, the toys 104a, 104b, 104c may be part of a "The Three Little Pigs" playset. For example, the FIG. 104a may represent the big, bad Wolf, the FIG. 104b may represent a Pig, and the toy house 104c may represent the straw house. In that embodiment, a user may re-enact the story of the Three Little Pigs using the toys 104a, 104b, 104c. For example, as shown, the user may place the Wolf 104a outside of the house 104c, with the Pig 104b inside the house 104c. The computing device 102 may detect the relative positions of the toys 104a, 104b, 104c. The computing device 102 may also capture video of the user playing with the toys 104a, 104b, 104c from a perspective 402.

After detecting the relative position of the toys 104a, 104b, 104c, the computing device 102 may determine the position of corresponding virtual objects and render a virtual camera scene. For example, the computing device 102 may render a virtual camera scene from a virtual perspective 404 of the Pig 104b. The scene may be rendered using 3-D models corresponding to the Wolf 104a, the Pig 104b, and the house 104c. For example, the virtual camera scene from the virtual perspective 404 may show the inside of a virtual straw house corresponding to the toy house 104c, with a virtual representation of the Wolf 104a visible through the window. As described above, predetermined behaviors of the virtual objects may be selected based on user input gestures. For example, in response to shaking the Wolf 104a in front of the toy house 104c, the virtual camera scene may include a predefined animation of the Wolf demanding to be let in to the house, huffing and puffing, or performing other predefined animations. As described above, the virtual camera scene may be displayed and/or played back on the display 136 of the computing device 102. In some embodiments, the computing device 102 may insert the virtual camera scene from the virtual perspective 404 into the video data captured from the perspective 402 of the camera 132.

It should be appreciated that, in some embodiments, the method 300 may be embodied as various instructions stored on a computer-readable media, which may be executed by the processor 120, the I/O subsystem 122, and/or other components of the computing device 102 to cause the computing device 102 to perform the method 300. The computer-readable media may be embodied as any type of media capable of being read by the computing device 102 including, but not limited to, the memory 124, the data storage device 126, other memory or data storage devices of the computing device 102, portable media readable by a peripheral device of the computing device 102, and/or other media.

EXAMPLES

Illustrative examples of the technologies disclosed herein are provided below. An embodiment of the technologies may include any one or more, and any combination of, the examples described below.

Example 1 includes a computing device for virtual camera frame generation, the computing device comprising: an object tracking module to determine a physical position of each of one or more physical objects with a position sensor of the computing device to detect a position sensor target of each of the one or more physical objects; a modeling module to determine one or more virtual object positions based on the physical positions of the one or more physical objects, wherein each virtual object position corresponds to a physical object of the one or more physical objects; and a rendering module to render a virtual camera scene based on the one or more virtual object positions, wherein the virtual camera scene includes one or more virtual objects corresponding to the one or more physical objects.

Example 2 includes the subject matter of Example 1, and wherein to determine the physical position of each of the one or more physical objects with the position sensor of the computing device comprises to sense a radio-frequency identification tag of each of the one or more physical objects.

Example 3 includes the subject matter of any of Examples 1 and 2, and wherein to determine the physical position of each of the one or more physical objects with the position sensor of the computing device comprises to detect a visual identifier of each of the one or more physical objects.

Example 4 includes the subject matter of any of Examples 1-3, and wherein to render the virtual camera scene comprises to: identify one or more three-dimensional models, wherein each of the three-dimensional models corresponds to one of the one or more physical objects; and render each of the one or more three-dimensional models.

Example 5 includes the subject matter of any of Examples 1-4, and wherein to render the virtual camera scene comprises to generate video data indicative of the virtual camera scene.

Example 6 includes the subject matter of any of Examples 1-5, and wherein the modeling module is further to determine a virtual camera point of view for the virtual camera scene based on the physical positions of the one or more physical objects.

Example 7 includes the subject matter of any of Examples 1-6, and wherein to determine the virtual camera point of view for the virtual camera scene based on the physical positions of the one or more physical objects comprises to: identify a first physical object of the one or more physical objects; and determine the virtual camera point of view based on the physical position corresponding to the first physical object.

Example 8 includes the subject matter of any of Examples 1-7, and wherein the modeling module is further to determine a predefined behavior associated with a virtual object as a function of the physical positions of the one or more physical objects, wherein the predefined behavior modifies one or more attributes of the virtual object.

Example 9 includes the subject matter of any of Examples 1-8, and wherein to determine the predefined behavior associated with the virtual object further comprises to determine the predefined behavior as a function of an identity associated with the one or more physical objects.

Example 10 includes the subject matter of any of Examples 1-9, and further comprising: a user input module to (i) capture user input data from a first physical object of the one or more physical objects and (ii) identify an input gesture based on the user input data; wherein the modeling module is further to determine a predefined behavior associated with a virtual object as a function of the input gesture, wherein the predefined behavior modifies one or more attributes of the virtual object.

Example 11 includes the subject matter of any of Examples 1-10, and wherein to capture the user input data comprises to capture motion data from a motion sensor of the first physical object.

Example 12 includes the subject matter of any of Examples 1-11, and wherein to capture the user input data comprises to capture touch input data from a touch sensor of the first physical object.

Example 13 includes the subject matter of any of Examples 1-12, and wherein: the object tracking module is further to determine a physical orientation of each of the one or more physical objects with the position sensor of the computing device; the modeling module is further to determine one or more virtual object orientations based on the physical orientations of the one or more physical objects; and to render the virtual camera scene further comprises to render the virtual camera scene based on the one or more virtual object orientations.

Example 14 includes the subject matter of any of Examples 1-13, and further comprising: a media capture module to capture media data indicative of a physical scene that includes the one or more physical objects; wherein the rendering module is further to insert the virtual camera scene into the media data indicative of the physical scene.

Example 15 includes the subject matter of any of Examples 1-14, and wherein to capture the media data comprises to capture video data by a video capture device of the computing device.

Example 16 includes the subject matter of any of Examples 1-15, and wherein to capture the media data comprises to capture audio data by an audio capture device of the computing device.

Example 17 includes the subject matter of any of Examples 1-16, and wherein to render the virtual camera scene comprises to adjust the virtual camera scene based on the media data indicative of the physical scene.

Example 18 includes the subject matter of any of Examples 1-17, and wherein to insert the virtual camera scene into the media data indicative of the physical scene comprises to: identify an insertion point in the media data; and insert the virtual camera scene at the insertion point.

Example 19 includes the subject matter of any of Examples 1-18, and wherein to identify the insertion point comprises to identify a content cue in the media data.

Example 20 includes the subject matter of any of Examples 1-19, and wherein to identify the insertion point comprises to: capture user input data from a first physical object of the one or more physical objects; identify an input gesture based on the user input data; and associate the insertion point with the input gesture.

Example 21 includes a method for virtual camera frame generation, the method comprising: determining, by a computing device, a physical position of each of one or more physical objects using a position sensor of the computing device to detect a position sensor target of each of the one or more physical objects; determining, by the computing device, one or more virtual object positions based on the physical positions of the one or more physical objects, wherein each virtual object position corresponds to a physical object of the one or more physical objects; and rendering, by the computing device, a virtual camera scene based on the one or more virtual object positions, wherein the virtual camera scene includes one or more virtual objects corresponding to the one or more physical objects.

Example 22 includes the subject matter of Example 21, and wherein determining the physical position of each of the one or more physical objects using the position sensor of the computing device comprises sensing a radio-frequency identification tag of each of the one or more physical objects.

Example 23 includes the subject matter of any of Examples 21 and 22, and wherein determining the physical position of each of the one or more physical objects using the position sensor of the computing device comprises detecting a visual identifier of each of the one or more physical objects.

Example 24 includes the subject matter of any of Examples 21-23, and wherein rendering the virtual camera scene comprises: identifying one or more three-dimensional models, wherein each of the three-dimensional models corresponds to one of the one or more physical objects; and rendering each of the one or more three-dimensional models.

Example 25 includes the subject matter of any of Examples 21-24, and wherein rendering the virtual camera scene comprises generating video data indicative of the virtual camera scene.

Example 26 includes the subject matter of any of Examples 21-25, and further comprising determining, by the computing device, a virtual camera point of view for the virtual camera scene based on the physical positions of the one or more physical objects.

Example 27 includes the subject matter of any of Examples 21-26, and wherein determining the virtual camera point of view for the virtual camera scene based on the physical positions of the one or more physical objects comprises: identifying a first physical object of the one or more physical objects; and determining the virtual camera point of view based on the physical position corresponding to the first physical object.

Example 28 includes the subject matter of any of Examples 21-27, and further comprising determining, by the computing device, a predefined behavior associated with a virtual object as a function of the physical positions of the one or more physical objects, wherein the predefined behavior modifies one or more attributes of the virtual object.

Example 29 includes the subject matter of any of Examples 21-28, and wherein determining the predefined behavior associated with the virtual object further comprises determining the predefined behavior as a function of an identity associated with the one or more physical objects.

Example 30 includes the subject matter of any of Examples 21-29, and further comprising: capturing, by the computing device, user input data from a first physical object of the one or more physical objects; identifying, by the computing device, an input gesture based on the user input data; and determining, by the computing device, a predefined behavior associated with a virtual object as a function of the input gesture, wherein the predefined behavior modifies one or more attributes of the virtual object.

Example 31 includes the subject matter of any of Examples 21-30, and wherein capturing the user input data comprises capturing motion data from a motion sensor of the first physical object.

Example 32 includes the subject matter of any of Examples 21-31, and wherein capturing the user input data comprises capturing touch input data from a touch sensor of the first physical object.

Example 33 includes the subject matter of any of Examples 21-32, and further comprising: determining, by the computing device, a physical orientation of each of the one or more physical objects using the position sensor of the computing device; and determining, by the computing device, one or more virtual object orientations based on the physical orientations of the one or more physical objects; wherein rendering the virtual camera scene further comprises rendering the virtual camera scene based on the one or more virtual object orientations.

Example 34 includes the subject matter of any of Examples 21-33, and further comprising: capturing, by the computing device, media data indicative of a physical scene that includes the one or more physical objects; and inserting, by the computing device, the virtual camera scene into the media data indicative of the physical scene.

Example 35 includes the subject matter of any of Examples 21-34, and wherein capturing the media data comprises capturing video data by a video capture device of the computing device.

Example 36 includes the subject matter of any of Examples 21-35, and wherein capturing the media data comprises capturing audio data by an audio capture device of the computing device.

Example 37 includes the subject matter of any of Examples 21-36, and wherein rendering the virtual camera scene comprises adjusting the virtual camera scene based on the media data indicative of the physical scene.

Example 38 includes the subject matter of any of Examples 21-37, and wherein inserting the virtual camera scene into the media data indicative of the physical scene comprises: identifying an insertion point in the media data; and inserting the virtual camera scene at the insertion point.

Example 39 includes the subject matter of any of Examples 21-38, and wherein identifying the insertion point comprises identifying a content cue in the media data.

Example 40 includes the subject matter of any of Examples 21-39, and wherein identifying the insertion point comprises: capturing user input data from a first physical object of the one or more physical objects; identifying an input gesture based on the user input data; and associating the insertion point with the input gesture.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for virtual camera frame generation, the computing device comprising: means for determining a physical position of each of one or more physical objects using a position sensor of the computing device to detect a position sensor target of each of the one or more physical objects; means for determining one or more virtual object positions based on the physical positions of the one or more physical objects, wherein each virtual object position corresponds to a physical object of the one or more physical objects; and means for rendering a virtual camera scene based on the one or more virtual object positions, wherein the virtual camera scene includes one or more virtual objects corresponding to the one or more physical objects.

Example 45 includes the subject matter of Example 44, and wherein the means for determining the physical position of each of the one or more physical objects using the position sensor of the computing device comprises means for sensing a radio-frequency identification tag of each of the one or more physical objects.

Example 46 includes the subject matter of any of Examples 44 and 45, and wherein the means for determining the physical position of each of the one or more physical objects using the position sensor of the computing device comprises means for detecting a visual identifier of each of the one or more physical objects.

Example 47 includes the subject matter of any of Examples 44-46, and wherein the means for rendering the virtual camera scene comprises: means for identifying one or more three-dimensional models, wherein each of the three-dimensional models corresponds to one of the one or more physical objects; and means for rendering each of the one or more three-dimensional models.

Example 48 includes the subject matter of any of Examples 44-47, and wherein the means for rendering the virtual camera scene comprises means for generating video data indicative of the virtual camera scene.

Example 49 includes the subject matter of any of Examples 44-48, and further comprising means for determining a virtual camera point of view for the virtual camera scene based on the physical positions of the one or more physical objects.

Example 50 includes the subject matter of any of Examples 44-49, and wherein the means for determining the virtual camera point of view for the virtual camera scene based on the physical positions of the one or more physical objects comprises: means for identifying a first physical object of the one or more physical objects; and means for determining the virtual camera point of view based on the physical position corresponding to the first physical object.

Example 51 includes the subject matter of any of Examples 44-50, and further comprising means for determining a predefined behavior associated with a virtual object as a function of the physical positions of the one or more physical objects, wherein the predefined behavior modifies one or more attributes of the virtual object.

Example 52 includes the subject matter of any of Examples 44-51, and wherein the means for determining the predefined behavior associated with the virtual object further comprises means for determining the predefined behavior as a function of an identity associated with the one or more physical objects.

Example 53 includes the subject matter of any of Examples 44-52, and further comprising: means for capturing user input data from a first physical object of the one or more physical objects; means for identifying an input gesture based on the user input data; and means for determining a predefined behavior associated with a virtual object as a function of the input gesture, wherein the predefined behavior modifies one or more attributes of the virtual object.

Example 54 includes the subject matter of any of Examples 44-53, and wherein the means for capturing the user input data comprises means for capturing motion data from a motion sensor of the first physical object.

Example 55 includes the subject matter of any of Examples 44-54, and wherein the means for capturing the user input data comprises means for capturing touch input data from a touch sensor of the first physical object.

Example 56 includes the subject matter of any of Examples 44-55, and further comprising: means for determining a physical orientation of each of the one or more physical objects using the position sensor of the computing device; and means for determining one or more virtual object orientations based on the physical orientations of the one or more physical objects; wherein the means for rendering the virtual camera scene further comprises means for rendering the virtual camera scene based on the one or more virtual object orientations.

Example 57 includes the subject matter of any of Examples 44-56, and further comprising: means for capturing media data indicative of a physical scene that includes the one or more physical objects; and means for inserting the virtual camera scene into the media data indicative of the physical scene.

Example 58 includes the subject matter of any of Examples 44-57, and wherein the means for capturing the media data comprises means for capturing video data by a video capture device of the computing device.

Example 59 includes the subject matter of any of Examples 44-58, and wherein the means for capturing the media data comprises means for capturing audio data by an audio capture device of the computing device.

Example 60 includes the subject matter of any of Examples 44-59, and wherein the means for rendering the virtual camera scene comprises means for adjusting the virtual camera scene based on the media data indicative of the physical scene.

Example 61 includes the subject matter of any of Examples 44-60, and wherein the means for inserting the virtual camera scene into the media data indicative of the physical scene comprises: means for identifying an insertion point in the media data; and means for inserting the virtual camera scene at the insertion point.

Example 62 includes the subject matter of any of Examples 44-61, and wherein the means for identifying the insertion point comprises means for identifying a content cue in the media data.

Example 63 includes the subject matter of any of Examples 44-62, and wherein the means for identifying the insertion point comprises: means for capturing user input data from a first physical object of the one or more physical objects; means for identifying an input gesture based on the user input data; and means for associating the insertion point with the input gesture.

The invention claimed is:

1. A computing device for virtual camera frame generation, the computing device comprising:
   an object tracking module to determine a physical position and a physical orientation of each of one or more physical objects with a position sensor of the computing device to detect a position sensor target of each of the one or more physical objects;
   a modeling module to (i) determine one or more virtual object positions based on the physical positions of the one or more physical objects, wherein each virtual object position represents a physical object of the one or more physical objects and (ii) determine a virtual camera point of view for a virtual camera scene based on the physical positions of the one or more physical objects; and
   a rendering module to render the virtual camera scene based on the one or more virtual object positions with the virtual camera point of view, wherein the virtual camera scene includes one or more virtual objects representing the one or more physical objects;
   wherein to determine the virtual camera point of view for the virtual camera scene based on the physical positions of the one or more physical objects comprises to (i) identify a first physical object of the one or more physical objects, and (ii) determine a virtual object position and virtual object orientation of the virtual camera point of view based on the physical position and the physical orientation corresponding to the first physical object.

2. The computing device of claim 1, wherein to determine the physical position of each of the one or more physical objects with the position sensor of the computing device comprises to sense a radio-frequency identification tag of each of the one or more physical objects.

3. The computing device of claim 1, wherein to render the virtual camera scene comprises to:
   identify one or more three-dimensional models, wherein each of the three-dimensional models corresponds to one of the one or more physical objects; and
   render each of the one or more three-dimensional models.

4. The computing device of claim 1, wherein the modeling module is further to determine a predefined behavior associated with a virtual object as a function of the physical positions of the one or more physical objects, wherein the predefined behavior modifies one or more attributes of the virtual object.

5. The computing device of claim 4, wherein to determine the predefined behavior associated with the virtual object further comprises to determine the predefined behavior as a function of an identity associated with the one or more physical objects.

6. The computing device of claim 1, further comprising:
   a user input module to (i) capture user input data from a first physical object of the one or more physical objects and (ii) identify an input gesture based on the user input data;
   wherein the modeling module is further to determine a predefined behavior associated with a virtual object as a function of the input gesture, wherein the predefined behavior modifies one or more attributes of the virtual object.

7. The computing device of claim 1, further comprising:
   a media capture module to capture media data indicative of a physical scene that includes the one or more physical objects;
   wherein the rendering module is further to insert the virtual camera scene into the media data indicative of the physical scene.

8. The computing device of claim 7, wherein to render the virtual camera scene comprises to adjust the virtual camera scene based on the media data indicative of the physical scene.

9. The computing device of claim 7, wherein to insert the virtual camera scene into the media data indicative of the physical scene comprises to:
   identify an insertion point in the media data; and
   insert the virtual camera scene at the insertion point.

10. The computing device of claim 9, wherein to identify the insertion point comprises to identify a content cue in the media data.

11. A method for virtual camera frame generation, the method comprising:
   determining, by a computing device, a physical position and a physical orientation of each of one or more physical objects using a position sensor of the computing device to detect a position sensor target of each of the one or more physical objects;
   determining, by the computing device, one or more virtual object positions based on the physical positions of the one or more physical objects, wherein each virtual object position represents a physical object of the one or more physical objects;
   determining, by the computing device, a virtual camera point of view for a virtual camera scene based on the physical positions of the one or more physical objects, wherein determining the virtual camera point of view for the virtual camera scene based on the physical positions of the one or more physical objects comprises (i) identifying a first physical object of the one or more physical objects, and (ii) determining a virtual object position and virtual object orientation of the virtual camera point of view based on the physical position and the physical orientation corresponding to the first physical object; and
   rendering, by the computing device, the virtual camera scene based on the one or more virtual object positions using the virtual camera point of view, wherein the virtual camera scene includes one or more virtual objects representing the one or more physical objects.

12. The method of claim 11, wherein determining the physical position of each of the one or more physical objects using the position sensor of the computing device comprises sensing a radio-frequency identification tag of each of the one or more physical objects.

13. The method of claim 11, further comprising determining, by the computing device, a predefined behavior associated with a virtual object as a function of the physical positions of the one or more physical objects, wherein the predefined behavior modifies one or more attributes of the virtual object.

14. The method of claim 11, further comprising:
capturing, by the computing device, user input data from a first physical object of the one or more physical objects;
identifying, by the computing device, an input gesture based on the user input data; and
determining, by the computing device, a predefined behavior associated with a virtual object as a function of the input gesture, wherein the predefined behavior modifies one or more attributes of the virtual object.

15. The method of claim 11, further comprising:
capturing, by the computing device, media data indicative of a physical scene that includes the one or more physical objects; and
inserting, by the computing device, the virtual camera scene into the media data indicative of the physical scene.

16. The method of claim 15, wherein inserting the virtual camera scene into the media data indicative of the physical scene comprises:
identifying an insertion point in the media data; and
inserting the virtual camera scene at the insertion point.

17. One or more non-transitory, computer-readable storage media comprising a plurality of instructions that in response to being executed cause a computing device to:
determine a physical position and a physical orientation of each of one or more physical objects using a position sensor of the computing device to detect a position sensor target of each of the one or more physical objects;
determine one or more virtual object positions based on the physical positions of the one or more physical objects, wherein each virtual object position represents a physical object of the one or more physical objects;
determine a virtual camera point of view for a virtual camera scene based on the physical positions of the one or more physical objects, wherein to determine the virtual camera point of view for the virtual camera scene based on the physical positions of the one or more physical objects comprises to (i) identify a first physical object of the one or more physical objects, and (ii) determine a virtual object position and virtual object orientation of the virtual camera point of view based on the physical position and the physical orientation corresponding to the first physical object; and
render the virtual camera scene based on the one or more virtual object positions using the virtual camera point of view, wherein the virtual camera scene includes one or more virtual objects representing the one or more physical objects.

18. The one or more non-transitory, computer-readable storage media of claim 17, wherein to determine the physical position of each of the one or more physical objects using the position sensor of the computing device comprises to sense a radio-frequency identification tag of each of the one or more physical objects.

19. The one or more non-transitory, computer-readable storage media of claim 17, further comprising a plurality of instructions that in response to being executed cause the computing device to determine a predefined behavior associated with a virtual object as a function of the physical positions of the one or more physical objects, wherein the predefined behavior modifies one or more attributes of the virtual object.

20. The one or more non-transitory, computer-readable storage media of claim 17, further comprising a plurality of instructions that in response to being executed cause the computing device to:
capture user input data from a first physical object of the one or more physical objects;
identify an input gesture based on the user input data; and
determine a predefined behavior associated with a virtual object as a function of the input gesture, wherein the predefined behavior modifies one or more attributes of the virtual object.

21. The one or more non-transitory, computer-readable storage media of claim 17, further comprising a plurality of instructions that in response to being executed cause the computing device to:
capture media data indicative of a physical scene that includes the one or more physical objects; and
insert the virtual camera scene into the media data indicative of the physical scene.

22. The one or more non-transitory, computer-readable storage media of claim 21, wherein to insert the virtual camera scene into the media data indicative of the physical scene comprises to:
identify an insertion point in the media data; and
insert the virtual camera scene at the insertion point.

* * * * *